(12) United States Patent
Siegel et al.

(10) Patent No.: US 6,499,970 B1
(45) Date of Patent: Dec. 31, 2002

(54) PUMP UNIT FOR A VEHICLE BRAKE SYSTEM

(75) Inventors: Heinz Siegel, Stuttgart (DE); Arnold Pahl, Markgroningen (DE); Rolf Hummel, Steinenbronn (DE); Barbara Schwind-Grellmann, Wiernsheim (DE); Martin Mohle, Steinheim (DE); Erika Mank, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 225 days.

(21) Appl. No.: 09/051,409

(22) PCT Filed: Aug. 8, 1997

(86) PCT No.: PCT/DE97/01706

§ 371 (c)(1),
(2), (4) Date: Apr. 9, 1998

(87) PCT Pub. No.: WO98/06610

PCT Pub. Date: Feb. 19, 1998

(30) Foreign Application Priority Data

Aug. 9, 1996 (DE) .......................................... 196 32 213

(51) Int. Cl.$^7$ ............................................... F04B 17/00
(52) U.S. Cl. .................... 417/410.1; 417/417; 417/360; 417/363

(58) Field of Search ................................. 417/360, 363, 417/410.1; 303/113.1; 267/152, 153, 293; 403/19, 21

(56) References Cited

U.S. PATENT DOCUMENTS

| | | | | |
|---|---|---|---|---|
| 4,998,781 A | * | 3/1991 | Siegel et al. | 417/363 |
| 5,066,076 A | * | 11/1991 | Troster | 303/113.1 |
| 5,466,055 A | * | 11/1995 | Schmitt et al. | 303/113.1 |
| 5,529,389 A | * | 6/1996 | Sekiguchi | 417/360 |
| 5,531,573 A | * | 7/1996 | Nokubo | 417/360 |
| 5,622,483 A | * | 4/1997 | Nokubo | 417/363 |
| 5,658,056 A | * | 8/1997 | Rischen et al. | 303/113.1 |

* cited by examiner

*Primary Examiner*—Timothy S. Thorpe
*Assistant Examiner*—Michael K. Gray
(74) *Attorney, Agent, or Firm*—Ronald E. Greigg

(57) ABSTRACT

A combination electric motor-pump unit which is installed on a body of a vehicle. The pump unit includes motor fastening screws with which the electric motor is fastened to the pump housing and which connect the pump unit to the vehicle body. This significantly reduces the number of required parts. The pump unit is provided for a brake system of a vehicle.

20 Claims, 3 Drawing Sheets

PUMP UNIT FOR A VEHICLE BRAKE SYSTEM

The invention is based on a pump unit for a brake system of a vehicle.

In a known pump unit, an electric motor is fastened to a pump housing. The disclosure of European patent application EP 0 699 571 A1 indicates a pump unit in which an electric motor is flange mounted to the pump housing and screwed tight via two motor fastening screws. So that the pump unit can be suspended inside a vehicle, blind hole-like recesses are disposed on two different sides of the pump housing and bush-like rubber-elastic elements are slid into these recesses. The rubber-elastic elements hold suspension bolts. Finally, a third blind hole-like bore Is also provided on a third side of the pump housing and a rubber elastic element is likewise slid into this bore. In this way, the pump unit is suspended in an elastically resilient manner at three suspension points in the body of the vehicle and is positionally secured to a sufficient degree.

In the known embodiment, it is disadvantageous that a large number of additional component pieces is required for the suspension of the pump unit in the vehicle body. It is also disadvantageous that a part of these component pieces is only slid in and can thus fall out before the installation of the pump unit into the vehicle body. It is additionally disadvantageous that a part of these component pieces protrudes a long way laterally and has a contour that is not easy to manufacture. It is furthermore disadvantageous that when installing the pump unit in the vehicle body, the suspension bolts must be secured against rotation through the use of a special tool and a fastening means with an internal thread must be screwed onto the suspension bolts through the use of another tool. As a result, installing the pump unit in the vehicle body is costly and is almost impossible to execute without special devices.

ADVANTAGES OF THE INVENTION

The pump unit according to the invention, has the advantage over the prior art that the number of component pieces required is significantly reduced.

The components that contribute to the connection between the pump unit and the vehicle body can advantageously be produced in a simple manner.

Also, it is advantageously assured without additional securing measures that no parts can inadvertently fall out even before the installation of the pump unit in the vehicle body.

The pump unit can be plugged together with the vehicle body in a simple manner. Another simple fastening screw can be advantageously used to improve the connection between the pump unit and the vehicle body.

Advantageous improvements and updates of the pump unit disclosed in the main claim are possible by means of the measures taken herein.

If the mated connecting piece is provided in a resilient or elastic material, then an easy-to-produce vibrational uncoupling of the pump unit from the body of the vehicle is thus advantageously produced.

By providing a recess associated with the vehicle body, the shaped part can advantageously be connected to the vehicle body in a very simple manner.

An advantageous, particularly easy-to-produce connection is produced when the screw head has a cylindrical outer surface which engages in a cylindrical inner surface provided on the mated connecting piece.

The motor fastening screw has a rotational driving feature so that during the mounting of the electric motor on the pump housing, a tool or a torque wrench can tighten the motor fastening screw. If this rotational driving feature is provided internally and so that it can be accessed on the end face, then the connection between the pump unit and the vehicle body is advantageously not impaired by the rotational driving feature and despite the rotational driving feature, the mated connecting piece can be embodied as simple in shape.

The radially protruding shoulder provided on the screw head offers the advantage that the pump unit can be fixed in the axial direction in relation to the vehicle body in a simple manner.

If two motor fastening screws are provided, which can be embodied identically and can both contribute to the connection between the pump unit and the vehicle body, then this offers the advantage that the mechanical strain is distributed.

If a fastening screw is additionally provided, with which the pump unit can be fixed on the vehicle body, then with a simple measure, it is advantageously assured that the screw head of the motor fastening screw cannot unintentionally slip out of the mated connecting piece provided on the vehicle body.

A particularly advantageous and suitable embodiment is one in which the electric motor is fastened to the pump housing via two motor fastening screws and both motor fastening screws are provided for the connection between the vehicle body and the pump unit, and the pump unit on the other hand is additionally secured with a fastening screw that is screwed into the pump housing. As a result, with a minimum of expenditure, a particularly secure connection is produced between the pump unit and the vehicle body.

If the thread provided on the pump housing is an internal thread, then a simple fastening screw can be used which is for the most part commercially available.

If two threads or if need be, more than two threads are provided on the pump unit for the attachment of a fastening screw, then this offers the advantage that by choice, one of the threads can be used in order to mount the pump unit to the vehicle body.

The shaped part comprised of resilient material which is disposed between the vehicle body and the fastening screw attains the advantage of a vibrational uncoupling between the pump unit and the vehicle body.

BRIEF DESCRIPTION OF THE DRAWINGS

Preferably selected, particularly advantageous exemplary embodiments of the invention are shown in simplified form in the drawings and explained in detail in the description below.

DESCRIPTION OF THE EXEMPLARY EMBODIMENTS

The pump unit embodied according to the invention can be used for a vehicle brake system in which the pressure in the vehicle brake system is intended to be produced or boosted with the aid of a pump driven by an electric motor. Preferably, the pump unit is provided in order to be able to supply the wheel brake cylinder with a hydraulic pressure independently of an actuation of the brake pedal. In addition to the pump unit, other pumps can be provided so that the pump unit can also be called a pre-loading pump.

Figure 1:
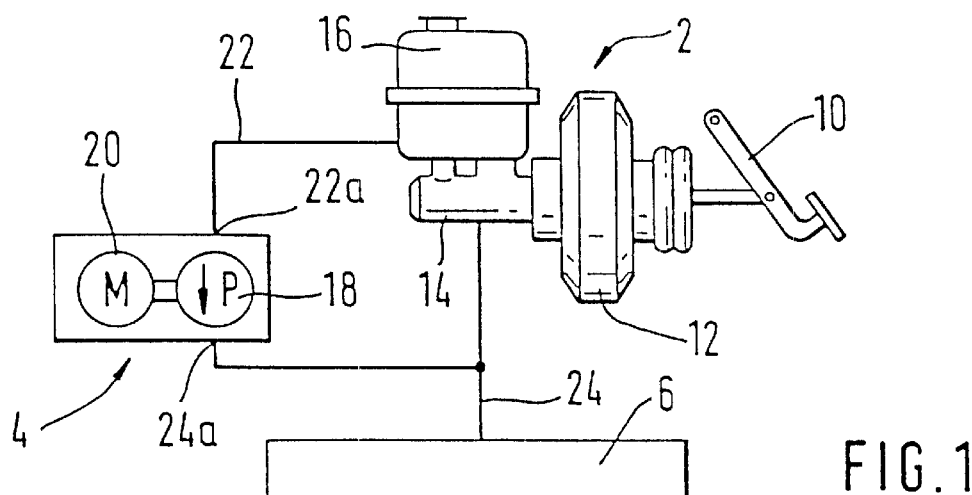
FIG. 1 shows a vehicle brake system in symbolic form, in which the pump unit can be used.

FIG. 1 shows a symbolically represented vehicle brake system that has been selected by way of example.

In FIG. 1, a brake unit 2, a pump unit 4, a brake control device 6, and a wheel brake 8 are represented. The wheel brake 8 has a brake cylinder, which is not depicted for the sake of clarity. The wheel brake 8 shown represents a number of wheel brakes that can be connected in parallel to the brake control device 6.

The brake unit 2 contains, for example, a brake actuating lever 10, a brake booster 12, a master cylinder 14, and a reservoir 16.

The pump unit 4 includes a pump 18 and an electric motor 20.

On the intake side, the pump unit 4 has an intake connection 22a, which is connected to the reservoir 16 via an intake line 22. A pressure line 24 leads from a pressure connection 24a provided on the pump unit 4 to the brake control device 6. The brake control device 6 is also connected to the master cylinder 14 via the pressure line 24. A brake line 26 leads from the brake control device 6 to the wheel brake 8. The other wheel brakes are likewise connected to the brake control device 6 via other brake lines, not shown. Depending on the number of brake circuits, other pressure lines, not shown, which are parallel in relation to the pressure line 24, can be provided between the master cylinder 14 and the brake control device 6.

Upon actuation of the brake lever 10, a hydraulic pressure is produced in the pressure line 24, which is supplied to the brake control device 6. Even without actuation of the brake lever 10, a hydraulic pressure can be built up in the pressure line 24 with the aid of the pump unit 4. The pressure supplied to the brake control device 6 via the pressure line 24 can be influenced in the brake control device 6 and is then is supplied in a correspondingly modulated fashion to the wheel brake 8 or the wheel brakes.

With electrical control of the electric motor 20, the electric motor 20 drives the pump 18, and the pump 18 receives a pressure medium from the reservoir 16 through the intake line 22 and through the intake connection 22a, and delivers the pressure medium through the pressure connection 24a and through the pressure line 24 to the brake control device 6. A fluid, preferably a brake fluid, is provided as a pressure medium.

In the brake control device 6, there are, for example, pressure valves, directional valves, and/or other pumps, which are not shown here for the sake of clarity and are for the purpose of influencing the brake pressure supplied to the wheel brake 8.

Figure 2:
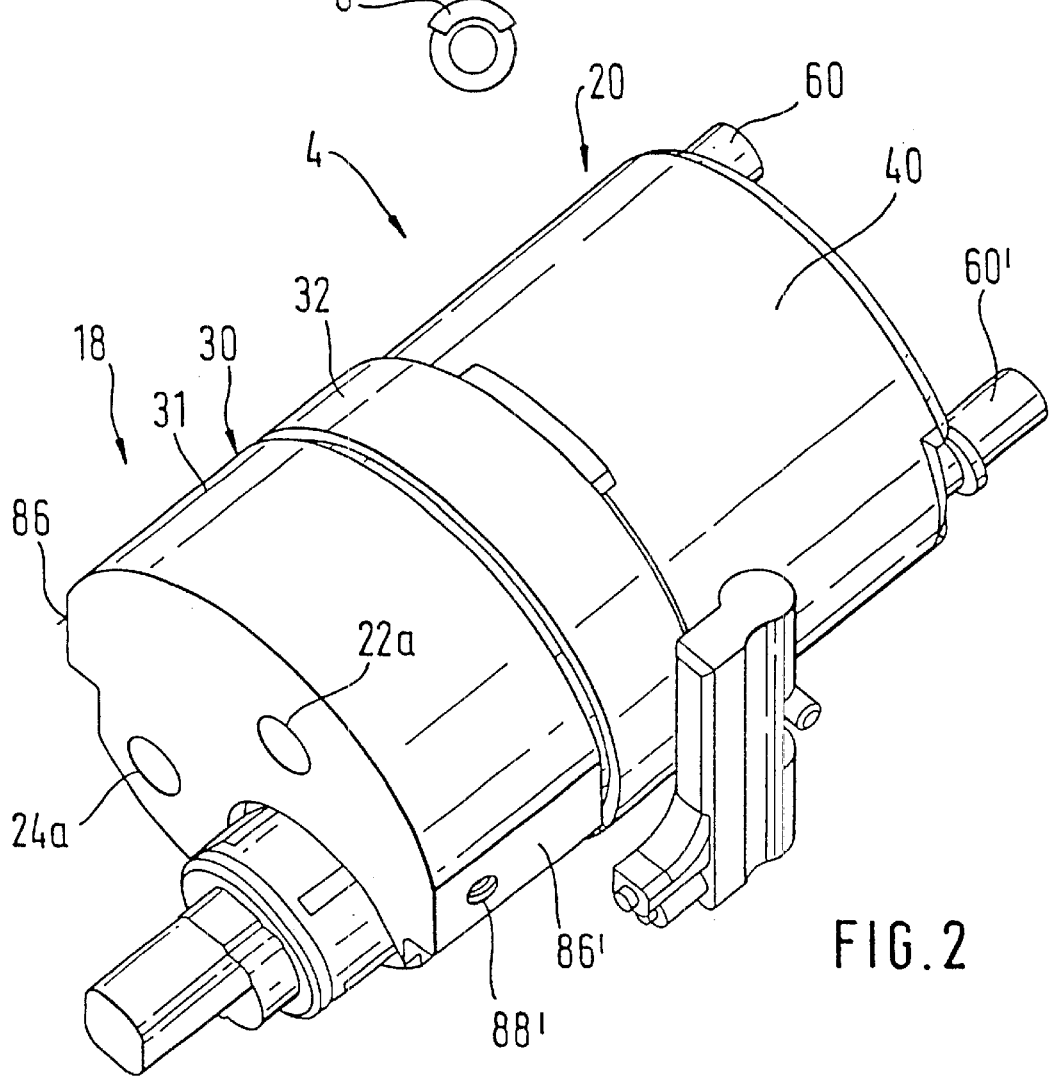
FIG. 2 is an oblique view.
Figure 3:
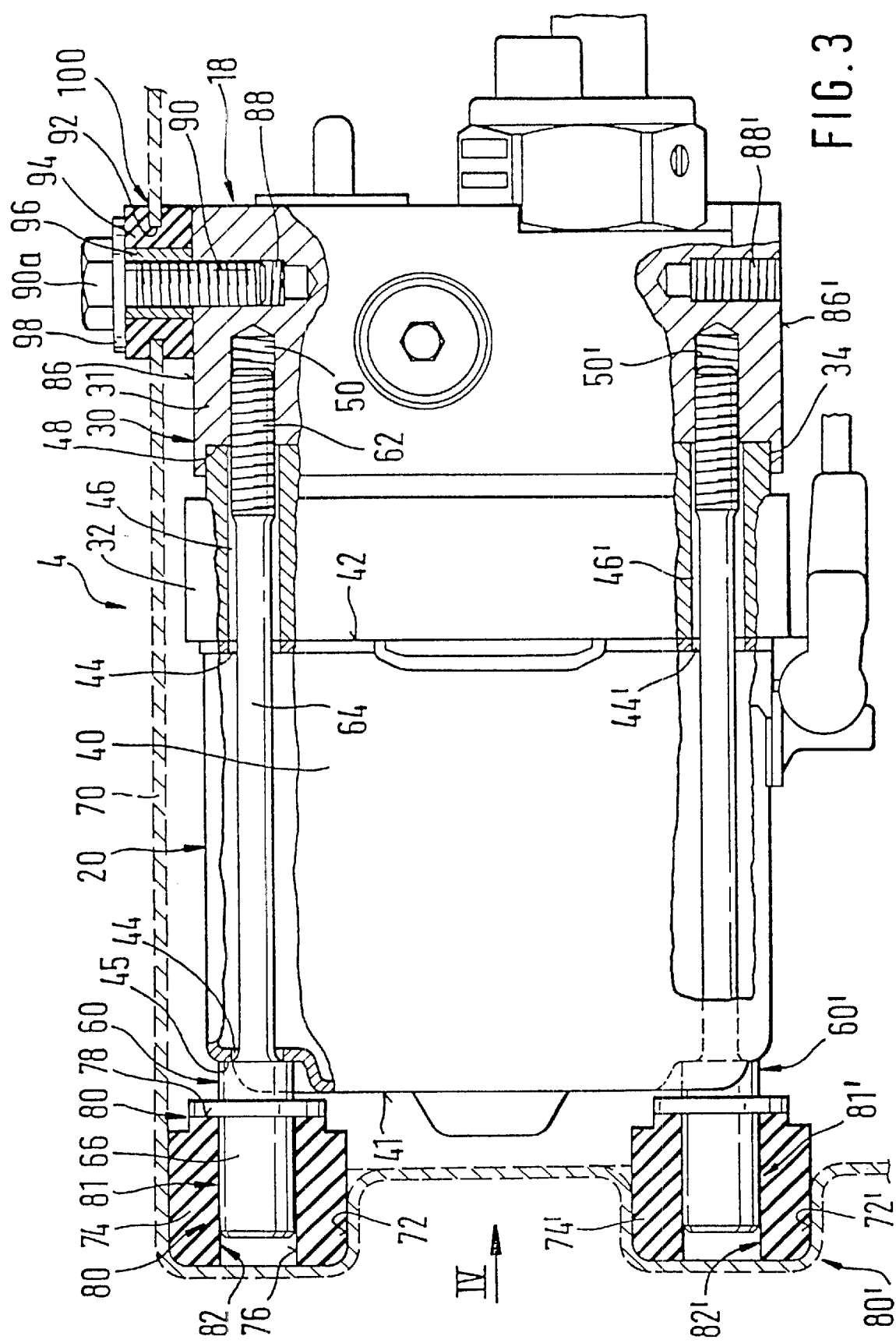
FIG. 3 is a partial cross sectional side view.
Figure 4:
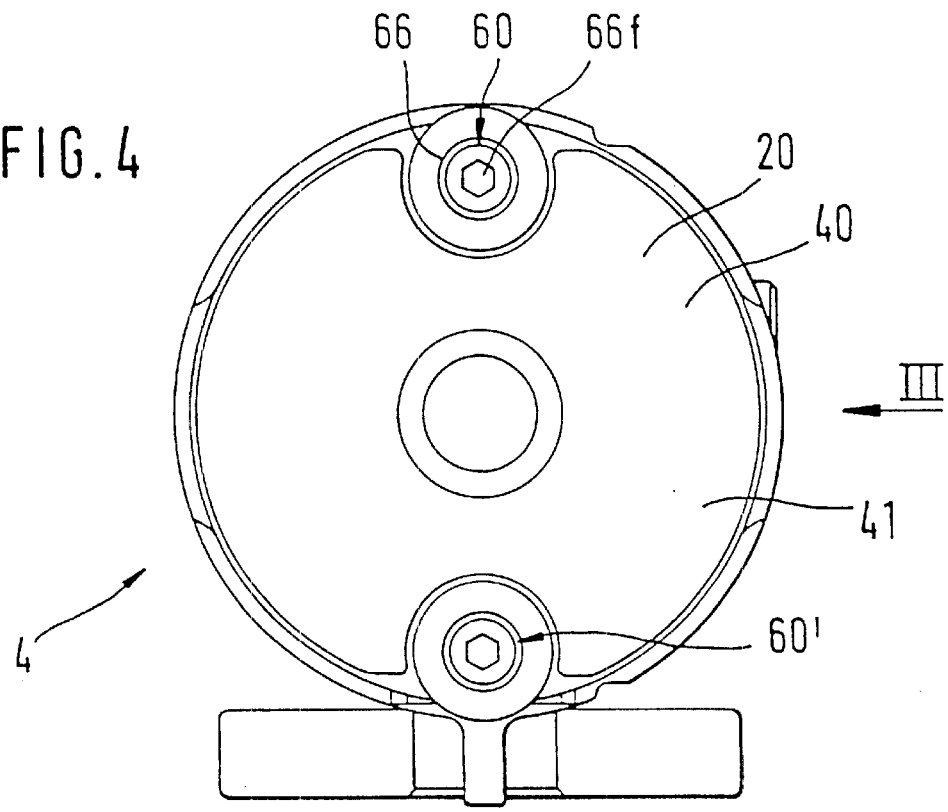
FIG. 4 is an end view.

In different scales, FIGS. 2, 3, 4, and 5 show different views and details of a particularly advantageous, preferably selected exemplary embodiment of the pump unit 4. In FIGS. 2, 3, and 4, the intake line 22 leading to the pump unit 4 and the pressure line 24 leading from the pump unit 4 are not shown for the sake of clarity.

In all of the FIGS., parts which are the same or function in the same manner are provided with the same reference numerals. As long as nothing to the contrary is mentioned or represented in the drawings, what is mentioned and represented in conjunction with one of the FIGS. is true for all FIGS. and exemplary embodiments. As long as the explanations do not say otherwise, the details of the different exemplary embodiments can be combined with one another.

FIG. 2 shows an oblique side view of the pump unit 4.

FIG. 3 shows a longitudinal side of the pump unit 4, wherein individual regions of the pump unit 4 are represented in sectional fashion for the sake of better understanding. FIG. 3 shows the pump unit 4 from a view direction indicated in FIG. 4 with an arrow III.

FIG. 4 shows an end view of the pump unit 4 from a view direction indicated in FIG. 3 with an arrow IV.

In the description below, the figure (FIG.) which shows the respective detail in a particularly clear manner is indicated in parentheses.

The pump 18 is disposed in a pump housing 30. The pump housing 30 is essentially comprised of a first pump housing part 31 and a second pump housing part 32 (FIGS. 2, 3). The electric motor 20 is flange-mounted to the pump housing 30.

The pump 18 is, for example, a gear pump. The pump 18 has, for example, gears which are driven to rotate by the electric motor 20. The gears deliver the pressure medium from the intake connection 22a (FIG. 2) to the pressure connection 24a. For the installation of the gears in the pump housing 30, the pump housing 30 is divided into the two pump housing parts 31 and 32. After the installation of the gears in the pump housing 30, the two pump housing parts 31 and 32 are assembled. A guide 34 is provided so that the two pump housing parts 31 and 32 cannot unintentionally move in relation to each other. The guide 34 is essentially embodied by a protruding step provided on the second pump housing part 32 and a recessed step on the first pump housing part 31, wherein the recessed step receives the protruding step.

The gears of the pump 18 are disposed essentially in the pump housing part 31 and the second pump housing part 32 essentially serves to cover the installation space for the gears. A bearing and a shaft supported in this bearing, for example, are also disposed in the second pump housing part 32 and are for transferring the torque from the electric motor 20 to the gears of the pump 18. The gears, the shaft, and the bearing mentioned are not shown in the drawing for the sake of clarity. It should also be mentioned that the pump 18 can also be, for example, a piston pump, preferably a radial piston pump.

The electric motor 20 is disposed inside a motor housing 40. The motor housing 40 is cylindrical and has an end face 41 oriented away from the pump housing 30 (FIG. 3), and an end face 42 oriented toward the pump housing 30. An opening 44 (FIG. 3) leads through the motor housing 40 from the end face 41 to the end face 42. A screw support face 45 is provided on the end face 41 of the motor housing 40. The screw support face 45 runs in an annular shape around the opening 44. Parallel to the opening 44, a second opening 44' leads from the end face 41 to the end face 42. The second pump housing part 32 is likewise approximately cylindrical (FIG. 2) and has an end face oriented toward the electric motor 20 and an end face oriented toward the first pump housing part 31. A through opening 46 leads through the pump housing part 32 from the one end face to the other end face. Parallel to this, a second through opening 46' is provided in the second pump housing part 32 and likewise connects the two end faces. Viewed in the simplest terms, the first pump housing part 31 also has an essentially cylindrical shape (FIG. 2), with an end face 48 oriented toward the second pump housing part 32 (FIG. 3). Starting from the end face 48, a blind hole leads into the pump housing part 31. An internal thread 50 is cut into this blind hole. Parallel to the internal thread 50, leading from the end face 48, a second blind hole is provided with a second internal thread 50'. If the two pump housing parts 31, 32 and the motor housing 40 are properly assembled with the electric motor 20, then the opening 44, the through opening 46, and the internal thread 50 are disposed in a row; then the opening 44', the through opening 46', and the internal thread 50' are also disposed in a row (FIG. 3).

In the pump unit 4, there is a motor fastening screw 60, which holds the electric motor 20 against the pump housing 30. The motor fastening screw 60 is also depicted separately in FIG. 5.

Figure 5:
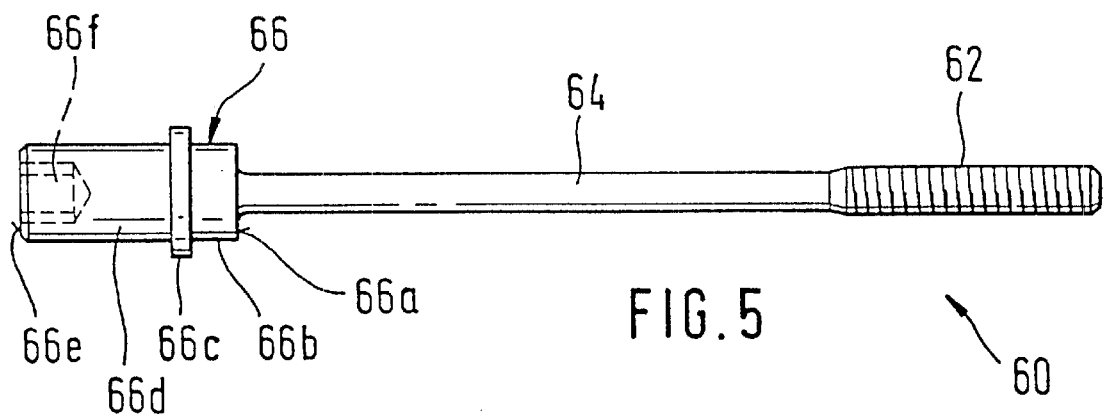
FIGS. 5 and 6 show differently embodied details of the pump unit.

FIG. 5 shows the motor fastening screw 60 before being installed in the motor housing 40 and the pump housing 30.

The motor fastening screw 60 can be conceptually divided into several regions. The motor fastening screw 60 has a region with a screw thread 62 (FIG. 5), a region with a shaft 64, and a region that is called the screw head 66 below. The shaft 64 connects the screw thread 62 to the screw head 66. The motor fastening screw 60, though, can also be embodied so that the screw thread 62 reaches all the way to the screw head 66. At the transition from the shaft 64 to the screw head 66, there is a shoulder (FIG. 5) so that a clamping surface 66a is produced on the screw head 66, oriented toward the screw thread 62. The screw head 66 is essentially cylindrical. On the outer jacket of the cylindrical screw head 66, there is a circumferential, radially protruding, disk-like ring 66c. The ring 66c is of one piece with the motor fastening screw 60 and is formed onto it by means of cutting or by means of non-cutting shaping work. The cylindrical screw head 66 has an end face 66e on the end remote from the screw thread 62 (FIG. 5). Between the clamping surface 66a and the disk-like ring 66c, the screw head 66 has a first head region 66b. The region of the screw head 66 between the disk-like ring 66c and the end face 66e is referred to below as the second head region 66d. Starting from the end face 66e, a recess leads into the screw head 66. The recess is not round. The recess has, for example, a six-sided cross section and therefore embodies a rotational driving feature 66f (FIGS. 4, 5) that can be engaged, for example, by a torque wrench for turning and tightening the motor fastening screw 60. In the exemplary embodiment shown in FIG. 5, the diameter of the first head region 66b is the same as that of the second head region 66d. It is possible to embody the diameter of the first head region 66b as larger or smaller than the diameter of the second head region 66d.

The screw thread 62 and the shaft 64 protrude through the opening 44 and through the through opening 46, and the screw thread 62 is screwed into the internal thread 50. The length of the motor fastening screw 60 is dimensioned so that when it is screwed in and tightened, the clamping surface 66a (FIG. 5) presses the motor fastening screw 60 against the screw support face 45 (FIG. 3) and clamps the electric motor 20, which is provided in the motor housing 40, against the pump housing 30. The exemplary embodiment shown is embodied so that the motor fastening screw 60 also clamps and fixes the second pump housing part 32 between the electric motor 20 and the first pump housing part 31. The motor fastening screw 60 holds the electric motor 20, the first pump housing part 31, and the second pump housing part 32 together.

In the pump unit 4, there is a second motor fastening screw 60' parallel to the motor fastening screw 60. The motor fastening screw 60' protrudes through the opening 44' and through the through opening 46' and is screwed into the internal thread 50'. Both motor fastening screws 60 and 60' are identically embodied and identically installed.

The pump unit 4 is fastened to a body 70 of a vehicle. For the sake of clarity, the vehicle body 70 is represented in the drawing (FIG. 3) with dashed lines and FIG. 4 shows the pump unit 4 before being installed on the vehicle body 70. The part provided with the reference numeral 70 does not have to be the vehicle body itself; rather, the part shown with the dashed lines and provided with the reference numeral 70 can be a largely arbitrary part connected to the actual vehicle body, e.g. a carrier, a motor support of an internal combustion engine, or a securing plate attached to the vehicle body. For the sake of simplicity, though, these parts connected to the vehicle body are also referred to below as the vehicle body 70. The pump unit 4 can be mechanically fastened—at least indirectly—to the vehicle body, for example by means of the carrier, the motor support, or the securing plate.

There is a recess 72 in the vehicle body 70. A shaped part 74 comprised of a resilient material is inserted into the recess 72. The shaped part 74 is comprised, for example, of elastic rubber or of an elastically resilient elastomer material. The shaped part 74 is matched to the recess 72 in terms of size so that the shaped part 74 is held securely in the recess 72 without falling out.

There is an opening in the shaped part 74, which constitutes a recess 76. The shaped part 74 has an end face that is used as a contact 78.

Next to the recess 72, there is a second recess 72' in the vehicle body 70, which is essentially embodied as identical to the recess 72. A second shaped part 74' is slid into the second recess 72'. The second shaped part 74' is identical to the shaped part 74.

The head region 66d (FIG. 5) of the motor fastening screw 60 can be slid into the recess 76 of the shaped part 74 until the ring 66c of the motor fastening screw 60 rests against the contact 78 provided on the shaped part 74. As a result, a mechanical connection 80 is provided between the pump unit 4 and the vehicle body 70. The mechanical connection 80 includes a connecting piece 81 associated with the pump unit 4 and a mated connecting piece 82 associated with the vehicle body 70. The connecting piece 81 of the mechanical connection 80 is disposed on the screw head 66 of the motor fastening screw 60. In the preferably selected exemplary embodiment, the screw head 66d of the motor fastening screw 60 constitutes the connecting piece 81 and the recess 76 on the shaped part 74 constitutes the mated connecting piece 82. By simply sliding the head region 66d of the motor fastening screw 60 into the recess 76 of the shape part 74, the pump unit 4 can be rapidly connected to the vehicle body 70 in a simple fashion. After the loosening of a fastening screw 90 (FIG. 3) described further below, the pump unit 4 can be simply and rapidly dismounted from the vehicle body 70 as needed by sliding the connecting piece 81 and the mated connecting piece 82 apart from each other.

A second mechanical connection 80' is produced between the second motor fastening screw 60' and the second shaped part 74'. The second mechanical connection 80' includes a second connecting piece 81' associated with the motor fastening screw 60' and a second mated connecting piece 82' associated with the vehicle body 70.

With the aid of the mechanical connections 80, 80', the pump unit 4 can be slid onto the vehicle body 70. As a result, the mechanical connection 80 or 80' can also be described as a plug connection. Correspondingly, the connecting piece 81 or 81' can be described as a plug connecting piece and the mated connecting piece 82 or 82' can also be described as a mated plug connecting piece.

On the outer circumference of the pump housing part 31 of the pump 18, a flattening 86 (FIG. 2) and a diametrically opposed second flattening 86' are provided. Starting from the flattening 86, an internal thread 88 leads into the pump housing part 31 of the pump housing 30 of the pump 18 (FIG. 3). Starting from the flattening 86', a second internal thread 88', leads into the pump housing part 31. A commercially available, reasonably priced fastening screw 90 (FIG. 3) can be screwed into the internal thread 88 and the second internal thread 88'.

A hole 92 is provided in the vehicle body 70. A shaped part 94 is attached in the hole 92. The shaped part 94 has a circumferential groove so that after the attachment of the shaped part 94 in the hole 92, the shaped part 94 is fixed to the vehicle body 70. The shaped part 94 is comprised of a resilient material, for example elastic rubber or an elastically resilient elastomer.

A bore extends axially through the shaped part 94 and a metallic sleeve 96 is plugged, vulcanized, or glued into this bore.

The fastening screw 90 has a screw head 90*a* with a wrench face. A disk 98 is provided between the screw head 90*a* and the shaped part 94, or the sleeve 96. When installed, the shaped part 94 is clamped between the disk 98 and the flattening 86 on the pump housing 30. As a result, a third connection 100 is produced between the vehicle body 70 and the pump unit 4. The sleeve 96 in the shaped part 94 assures that when the fastening screw 90 is screwed in or tightened, the shaped part 94 is not excessively pinched. The sleeve 96 consequently protects the shaped part 94 from excessive strain. Because of the sleeve 96, the fastening screw 90 can be properly tightened without the danger of excessive strain on the shaped part 94. The fastening screw 90 can be tightened snugly so that there is no danger of an unintentional loosening of the fastening screw 90, even when it is subjected to vibration.

With the aid of the three mechanical connections 80, 80', and 100, a simply producible, statically fixed three-point support of the pump unit 4 on the vehicle body 70 is produced. Because the two mechanical connections 80 and 80' constituted by the motor fastening screws 60 and 60' are disposed as far as possible from the third connection 100 provided in the region of the first pump housing part 31, a particularly favorable, stable attachment of the pump unit 4 to the vehicle body 70 is produced, and when subjected to vibration, a relatively low stress on the shaped parts 74, 74', and 94 is also produced.

Due to the quite large clamping length between the clamping surface 66*a* (FIG. 5) of the motor fastening screw 60 and the internal thread 50 in the pump housing 30, even when a greater exertion of vibration occurs, there is no danger of the motor fastening screw 60 loosening. The motor fastening screw 60 is embodied approximately after the fashion of a so-called expansion bolt, which—as is known—offers a high degree of security against loosening. Because the motor fastening screw 60 is screwed tight and will not loosen unintentionally, the two connections 80 and 80' produce a good connection between the pump unit 4 and the vehicle body 70 and this connection lasts a long time, even when subjected to vibration.

The end face 41 of the motor housing 40 is slightly recessed in the region of the screw support face 45. This produces a stiffening of the motor housing 40, which improves the securing of the motor fastening screw 60 without the danger of a deformation of the motor housing 40.

Figure 6:
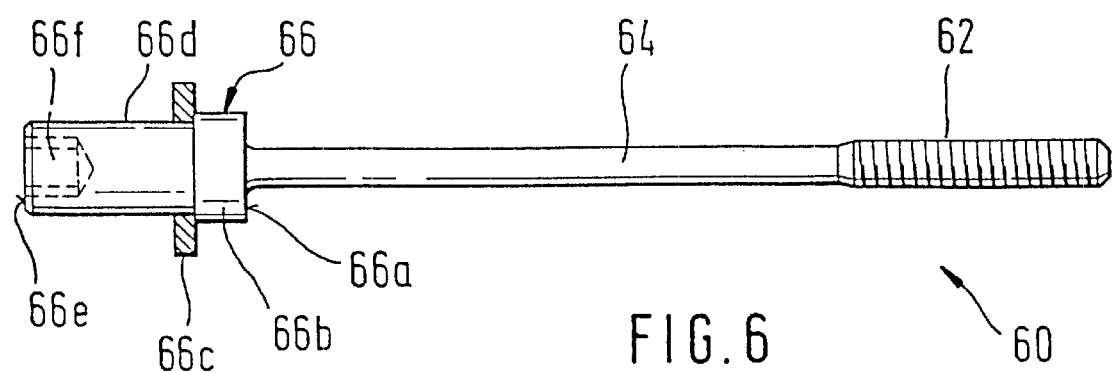

FIG. 6 shows a preferably selected modification of the motor fastening screw 60 by way of example.

In the case of the motor fastening screw 60 shown by way of example in FIG. 6, the first head region 66*b* has a slightly greater diameter than the second head region 66*d*. The disk-like ring 66*c* is not formed of one piece onto the motor fastening screw 60, but is slid or press mounted as a separate component onto the head region 66*d* until the ring 66*c* comes into contact with the end face of the head region 66*b*. When installed, the manner of function of the motor fastening screw 60 represented in FIG. 6 is the same as the manner of function of the motor fastening screw 60 represented in FIG. 5. Depending on the manufacturing method of the motor fastening screw 60, it can involve less expense to form the ring 66*c* of one piece onto the screw head 66, as with the motor fastening screw 60 shown in FIG. 5, or to slide the ring 66*c* onto the screw head 66, as shown in FIG. 6, because then the base material for the motor fastening screw 60 can have a smaller outer diameter.

A particular installation position of the pump unit 4 must be taken into account so that the pump unit 4 can function properly. For example, an arbitrary rotation of the pump unit 4 around its longitudinal axis is not possible. However, because depending on the vehicle in which the pump unit 4 is intended to be installed, the accessibility for the installation of the fastening screw 90 is variously favorable in different locations, in the preferably selected exemplary embodiment, the two internal threads 88 and 88' are provided, wherein it is completely sufficient to insert the fastening screw 90 into only one of the two internal threads 88 or 88'. By providing the two internal threads 88 and 88', the respectively better suited internal thread 88 or 88' can be selected for screwing in the fastening screw 90, without adding to the expense. A third or other internal thread can also be provided, wherein by choice, the fastening screw 90 is screwed into one of the internal threads.

The elastic shaped parts 74, 74', and 94 provide for a vibrational uncoupling of the pump unit 4 from the vehicle body 70. The shaped parts 74, 74', and 94 therefore aid in noise reduction.

The foregoing relates to preferred exemplary embodiments of the invention, it being understood that other variants and embodiments thereof are possible within the spirit and scope of the invention, the latter being defined by the appended claims.

What is claimed is:

1. A pump unit for a vehicle brake system, comprising a pump housing (30, 31, 32), an electric motor (20), said electric motor including a motor housing which is mounted on the pump housing and held against the pump housing with at least one motor fastening screw (60, 60'), said motor fastening screw has a screw thread screwed into the pump housing and a screw head supported against the motor housing, the pump unit is mechanically affixed to a body part of a vehicle via at least one connection, the screw head (66) of the motor fastening screw (60, 60') constitutes a first connecting piece of a connection (80) wherein the connecting piece engages a mated second connecting piece (82, 82') of the connection (80), and said mated second connecting piece (82, 82') is mated with the vehicle body part (70).

2. A pump unit according to claim 1, in which the vehicle body (70) is connected with a shaped part (74, 74') comprised of a resilient material which is mated with the vehicle body part and the mated second connecting piece (82) is provided on the shaped part.

3. A pump unit according to claim 2, in which the shaped part (74, 74') is inserted into a recess (72, 72') in the vehicle body part (70).

4. A pump unit according to claim 1, in which the screw head (66) has a cylindrical outer surface (66*d*) and the mated second connecting piece (82, 82') has a cylindrical inner surface (76), wherein the cylindrical outer surface (66*d*) engages in the cylindrical inner surface (76).

5. A pump unit according to claim 1, in which the screw head (66) is provided with an internal rotational driving feature (66*f*) that is assessed from the end face.

6. A pump unit according to claim 1, in which the screw head (66) is provided with a radially protruding step (66*c*) which is contacted by the mated second connecting piece (82, 82').

7. A pump unit according to claim 6, in which the step (66*c*) is provided circumferentially on the motor fastening screw (60, 60').

8. A pump unit according to claim 1, in which a second motor fastening screw (60) is provided.

9. A pump unit according to claim 1, in which at least one screw thread (88, 88') is provided on the pump housing (30, 31, 32) for fastening screw means (90) used for at least one connection to the vehicle body part (70).

10. A pump unit according to claim 9, in which the thread (88, 88') is an internal thread (88, 88).

11. A pump unit according to claim 9, in which two threads (88, 88') are provided.

12. A pump unit according to claim 9, in which between the screw means (90) and the vehicle body part (70) a shaped part (94) comprised of a resilient material is provided, which is engaged by the screw means (90).

13. A pump unit according to claim 1, in which the connection (80), is a plug connection.

14. A pump unit according to claim 2, in which the screw head (66) has a cylindrical outer surface (66*d*) and the mated second connecting piece (82, 82') has a cylindrical inner surface (76), wherein the cylindrical outer surface (66*d*) engages the cylindrical inner surface (76).

15. A pump unit according to claim 3, in which the screw head (66) has a cylindrical outer surface (66*d*) and the mated second connecting piece (82, 82') has a cylindrical inner surface (76), wherein the cylindrical outer surface (66*d*) engages in the cylindrical inner surface (76).

16. A pump unit according to claim 2, in which the screw head (66) is provided with a radially protruding step (66*c*) which is contacted by the mated second connecting piece (82, 82').

17. A pump unit according to claim 3, in which the screw head (66) is provided with a radially protruding step (66*c*) which is contacted by the mated second connecting piece (82, 82').

18. A pump unit according to claim 2, in which at least one screw thread (88, 88') is provided on the pump housing (30, 31, 32) for screw means (90) used for at least one connection to the vehicle body part (70).

19. A pump unit according to claim 10, in which between the screw means (90) and the vehicle body part (70) a shaped part (94) comprised of a resilient material is provided, which is engaged by the screw means (90).

20. A pump unit according to claim 11, in which between the screw means (90) and the vehicle body part (70) a shaped part (94) comprised of a resilient material is provided, which is engaged by the screw means (90).

* * * * *